United States Patent
Hurtig

[15] 3,640,393
[45] Feb. 8, 1972

[54] LIQUID CONTAINER HAVING PRESSURE-PROTECTED DIALYZING MEMBRANE

[72] Inventor: Carl R. Hurtig, Scituate, Mass.
[73] Assignee: Damon Corporation, Needham Heights, Mass.
[22] Filed: Sept. 4, 1970
[21] Appl. No.: 69,767

[52] U.S. Cl. ............210/321, 128/DIG. 5, 128/2 F, 73/425.6
[51] Int. Cl. .......................A61b 05/10, B01d 31/00
[58] Field of Search............210/22, 321; 128/2 R, 2 F, 128/214 R, DIG. 5; 23/258.5; 73/425.6

[56] References Cited

UNITED STATES PATENTS

| | | | |
|---|---|---|---|
| 2,765,923 | 10/1956 | Novak | 210/164 |
| 3,045,494 | 7/1962 | Gerarde | 73/425.6 |
| 3,459,176 | 8/1969 | Leonard | 128/2 F |
| 3,485,751 | 12/1969 | Herrmann et al. | 210/22 |
| 3,512,517 | 5/1970 | Kadish et al. | 128/2 R |
| 3,518,982 | 7/1970 | Timmins et al. | 128/2 R |

*Primary Examiner*—Dalton L. Truluck
*Attorney*—Kenway, Jenney & Hildreth

[57] ABSTRACT

A liquid container has a dialyzing membrane forming first and second compartments within a chamber on either side of the membrane. An inlet passage feeds into only the first compartment, which is pumpable to aspirate liquid into it via the inlet passage. A liquid-pervious member in the first compartment backs up the membrane to support it when there is a greater pressure in the second compartment than in the first.

8 Claims, 2 Drawing Figures

PATENTED FEB 8 1972

3,640,393

INVENTOR
CARL R. HURTIG
BY
Kenway, Jenney & Hildreth
ATTORNEYS 3,640,393

LIQUID CONTAINER HAVING PRESSURE-PROTECTED DIALYZING MEMBRANE

BACKGROUND

This invention provides an improvement for a pumpable container for use in the collection and storage of liquids that are to be subjected to chemical analysis or other processing that includes dialysis. More particularly, the invention provides a membrane-supporting member for a container pumpable to aspirate liquid into a donor compartment separated from a recipient compartment by a semipermeable membrane.

The invention is particularly suited for use in a clinical sample container as described in the copending Patent application Ser. No. 884,924, filed Dec. 15, 1969 and in the copending application Ser. No. 65,540 of Andres Ferrari, filed Aug. 20, 1970, for Dialyzing Liquid-Collecting Container, both assigned to the assignee hereof. Accordingly, for purpose of illustration the invention is here described in that context.

The latter application noted above describes a liquid container having a semipermeable membrane forming two compartments on either side thereof within a chamber closed except for an inlet passage feeding a first of the compartments. The container is pumpable to aspirate liquid into the first compartment, and crystalline constituents of the aspirated liquid diffuse through the membrane to the other compartment.

However, semipermeable dialysis membranes typically are relatively fragile. Hence, when the latter, recipient compartment is sealed closed except for the porosity of the membrane separating it from the first compartment, it has been found that pumping of the container to aspirate the liquid can produce sufficient pressure across the membrane to damage it. This problem of membrane rupture or like damage is particularly likely to occur when the dialysis desired of the container calls for a particularly fragile membrane.

Accordingly it is an object of this invention to provide a support member for protecting the dialysis membrane of such a container from damage due to this and other pressure differentials.

More particularly, an object of this invention is to provide a pumpable liquid-aspirating container having a semipermeable membrane therein likely to be subjected to a pressure differential thereacross and having a membrane-supporting element to receive the pressure to which the membrane is otherwise subjected.

Another object is to provide a pressure-bearing, membrane-supporting member in a container of the above character and which allows essentially free diffusion of crystalline liquid through the membrane.

A further object of the invention is to provide sample container apparatus of the above character which can be fabricated readily and at low cost.

Other objects of the invention will in part be obvious and will in part appear hereinafter.

SUMMARY OF THE INVENTION

A pumpable dialyzing container according to the invention has a liquid-pervious sheet or plate backing up the semipermeable dialyzing membrane on the low-pressure side thereof within the container. This low-pressure side of the membrane faces the container compartment into which the inlet passage feeds the aspirated liquid and hence is the side which is vented to the environment by way of the passage. The support sheet has less elasticity than the membrane and is secured in the container at least equally as taut as the membrane.

With this construction, when the container is collapsed to aspirate a liquid sample and the unvented side of the membrane thereby receives a greater pressure than the vented side, the membrane deflects only slightly before bearing against the backing sheet. The backing sheet then bears the pressure differential, and saves the membrane from damage.

The invention accordingly comprises the features of construction, combination of elements, and arrangement of parts exemplified in the construction hereinafter set forth, and the scope of the invention is indicated in the claims.

BRIEF DESCRIPTION OF DRAWINGS

For a fuller understanding of the nature and objects of the invention, reference should be had to the following detailed description taken in connection with the accompanying drawings in which.

DESCRIPTION OF ILLUSTRATED EMBODIMENT

Figure 1:
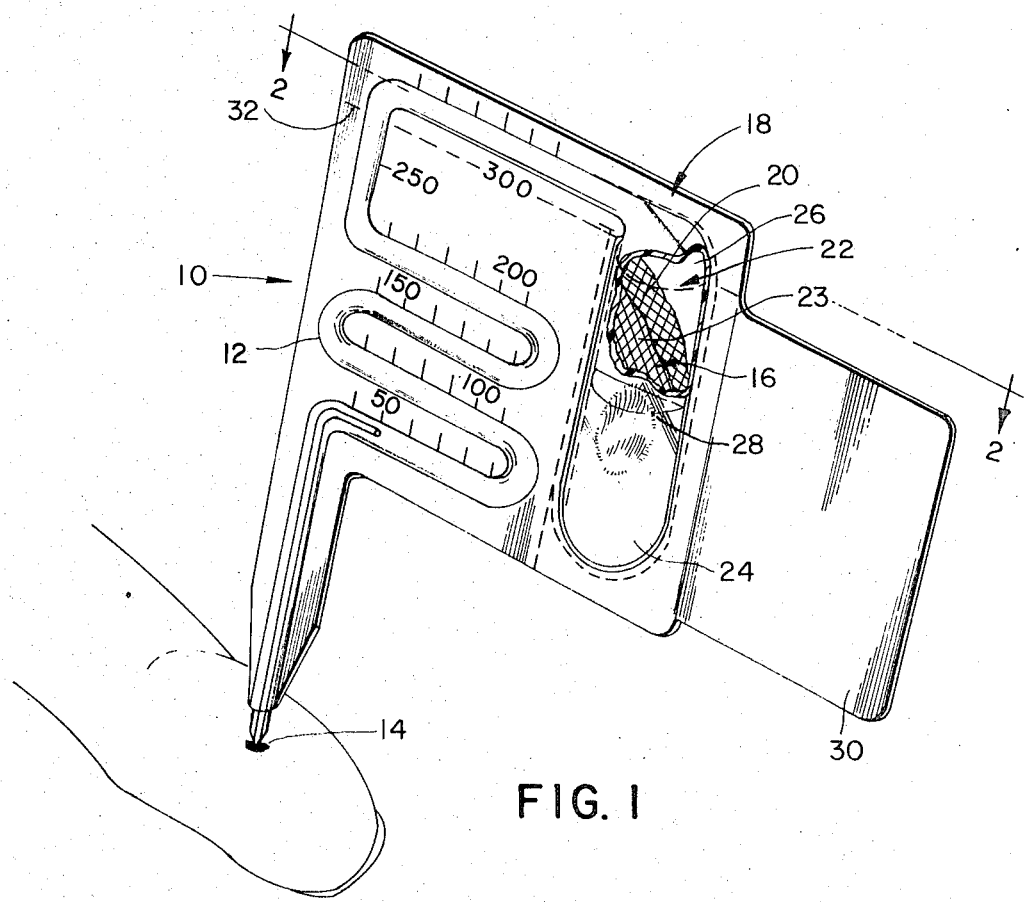
FIG. 1 is a pictorial view, partly broken away, of a container embodying the invention disposed for collecting a blood sample from a dermal puncture in a finger.

With reference to the drawings, a container 10 constructed in accordance with the aforementioned applications and embodying the invention has a graduated passage 12 feeding from an input opening 14 into a donor compartment 16 of a collapsible chamber 18 having opposed bulbous outer walls 24 and 26. A dialyzing membrane 20 forms the donor compartment 16 within the chamber alongside a recipient compartment 22 on the other side of the membrane. The two compartments are sealed from each other except for the porosity of the membrane 20, and the recipient compartment 22 is otherwise sealed from the environment.

A backing sheet 23 extends alongside the membrane 20 in the donor compartment 16. The sheet is porous to the liquids that are to be placed in the chamber 18 and hence does not interfere with dialysis through the membrane 20. However, the sheet has less elasticity than the membrane, and accordingly supports the membrane against undue distension into the space normally in the donor compartment. Such undue distension can otherwise occur when the pressure in the recipient compartment is significantly greater than that in the donor compartment.

As also shown, a liquid reagent 28 for preserving and/or diluting the sample can be placed in the chamber 18 prior to the collection of the sample.

A record panel 30 for bearing identification of the sample being collected and other pertinent information can be provided on the container to extend along the side of the chamber 18 and can serve, together with the coiled collection passage 12 and the chamber 18, as a handle for the secure holding of the container.

The chamber wall 24 is shown in FIG. 1 slightly collapsed into the chamber, as the user normally would do during the sample-collecting process simply by pressing the wall inward prior to placing the input opening 14 into the liquid being collected. Upon being released slightly, the resiliency of the chamber wall 24 restores the donor compartment part way to an uncollapsed condition and thereby draws the liquid into the passage 12 under positive pressure conditions. The operator controls the expansion of the chamber wall 24 until he has collected the desired volume of sample in the passage 12, at which point he simply removes the input opening 14 from the liquid source and fully releases the wall 24. This allows the wall 24 resiliency to resume fully its normal uncollapsed condition shown in FIG. 2 and thereby to aspirate the collected sample from the passage 12 into the chamber donor compartment 16. After the desired volume of sample is collected in this manner, the passage 12 can be sealed closed, either at the opening 14 or along the length thereof, in a conventional manner.

As soon as the sample enters the donor compartment 16, crystalline constituents of it commence to diffuse through the membrane 20 to the recipient compartment 22. After a relatively brief time, the dialysis is essentially complete. The liquid in each compartment can be withdrawn by way of a needle puncturing the outer wall 24 or 26 of the compartment of interest. Alternatively, the container can be cut open, as along the dashed line 32 (FIG. 1), or otherwise, to expose the compartment contents. As a further alternative, the chamber 18 can be provided with one or more initially sealed outlet tubes leading from each compartment.

The illustrated chamber 18 is thus seen to be a pouchlike vessel with opposed sidewalls 24 and 26. The chamber is fluid-tight except for the entry of the passage 12 into it and the chamber volume is tailored to the maximum volume of sample which is to be collected. To aspirate this volume of sample first into the graduated passage 12 and then into the donor compartment, the chamber donor compartment should have a volume, in excess of the volume of reagent 28 therein, that is at least two and preferably three or more times larger than the volume of sample to be collected. And as noted, the chamber wall 24 can be depressed inward to reduce the volume of the donor compartment 16 by at least twice the volume of the graduated passage 12. Upon being released, the wall 24 restores automatically to its normal concave shape, FIG. 1, construction, sufficient resilient force to aspirate the sample liquid into the passage 12 and then into the donor compartment 16.

The membrane-supporting backing sheet 23 can, by way of example, be a perforated film or plate, or a woven or other mesh. It is made of material inert to the liquids and environmental gases to which the interior of the chamber 18 is to be exposed. Suitable materials include polyethylene, polyvinylchloride, polystyrene, polychlorofluoroethylene (as commercially available as Kel-F), polytetrafluoroethylene (as commercially available as Teflon), nylon resins, and the like. Whatever its construction, the backing sheet is sufficiently more inelastic than the membrane 20 so that any pressure differential tending to deflect the membrane significantly toward the chamber wall 24 is resisted not by the membrane but by the backing sheet. Further, the backing sheet has sufficient tensile strength to withstand the maximum pressure differential likely to develop between the two compartments 16 and 22.

The backing sheet 23 preferably spans the entire area of the membrane 20 within the chamber 18. As further illustrated, it preferably is secured so as to be contiguous with the membrane even when there is no pressure differential across the membrane. Also, the backing sheet should have less slack than the membrane.

The illustrated container 10 is constructed as a laminate of two casing panels 34 and 36. Panel 34, which includes the chamber wall 24, is recessed with a channel that forms walls of the passage 12. The other panel 36 has no channel. Instead panel 36 has a flat surface opposite the passage-forming channel of panel 34 and which closes the channel to form the passage 12. Also the casing panel 36 includes the chamber wall 26. The record panel 30 of the illustrated container is provided entirely by the casing panel 36.

The two casing panels 34 and 36 are bonded together as shown, with the dialyzing membrane 20 and the backing sheet 23 together sealed between the mating faces of the casing panels continuously along the juncture of the chamber wall 26 with the adjoining portions of the casing panel 36. The backing sheet is disposed on the side of the membrane facing the panel 34. The membrane 20 thus divides the bulbous space between the walls 24 and 26 into the two compartments 16 and 22. The backing sheet is in the donor compartment 16, and the passage 12 feeds into only this compartment. The casing panels 34 and 36 can, by way of example, be made of polyethylene. The chamber walls portion of either or both panels can be thinner than the other portions thereof as illustrated, to provide the flexible resiliency and other properties desired for these walls. Also, the casing panel 36 can have a different thickness along the record panel 30 than along other portions thereof; it is illustrated as forming a thinner record panel. In the illustrated container 10, the two casings together have sufficient overall rigidity so that the container normally maintains the overall upright shape as shown. The dialyzing membrane 20 can be made of material conventional for semipermeable membranes, such as regenerated cellulose, nitrocellulose or radiation-drilled plastic.

The foregoing container construction forms the chamber 18 within a relatively stiff peripheral framelike web formed by the mating portions of casing panels 34 and 36 at the junctures of the chamber walls 24 and 26 with these panels. Further, the backing sheet 23 is secured to this stiff peripheral chamber frame. This arrangement enables the free span of the backing sheet within the chamber to be at least equally as taut as the free span of the membrane 20. Further, the chamber frame provided by the casing panels does not deform significantly when the chamber wall 24 is collapsed, as for aspirating a sample. These features enhance the stiffness with which the backing sheet supports the membrane 20 in the event of a pressure unbalance.

Although only a single backing sheet is shown and it is on the donor compartment of the dialysis membrane, where desired a like backing sheet can be provided on the other side of the membrane.

It will thus be seen that the objects set forth above, among those made apparent from the preceding description, are efficiently attained. Further, all matter contained in the above description or shown in the accompanying drawings shall be interpreted as illustrative and not in a limiting sense, inasmuch as certain changes may be made in the above construction without departing from the scope of the invention. It is also to be understood that the following claims are intended to cover all of the generic and specific features of the invention herein described, and all statements of the scope of the invention which, as matter of language, might be said to fall therebetween.

Having described the invention, what is claimed as new and secured by Letters Patent is:

1. Liquid container apparatus comprising
   A. liquid-impervious wall means forming a chamber with at least a collapsible and resiliently restoring externally accessible wall portion,
   B. a dialyzing membrane within said chamber dividing the chamber interior into at least first and second compartments arranged with said collapsible wall portion forming at least part of the wall of said first chamber,
   C. inlet tubing means feeding into only said first of said first and second compartments, and said first compartment being closed except for said inlet tubing means and the porosity of said membrane, and
   D. a liquid-pervious support member adjacent the side of said membrane in said first compartment and supporting said membrane against a greater pressure in said second compartment than in said first compartment.

2. Container apparatus as defined in claim 1 in which
   A. said wall means forms said chamber with two opposed wall portions at least a first of which is externally accessible and collapsible and resiliently restoring,
   B. said dialyzing membrane is disposed in said chamber between said two opposed wall portions such that said first wall portion forms a portion of said first compartment, and
   C. said support member is essentially contiguous with said membrane along the membrane span within said chamber.

3. Container apparatus as defined in claim 1 in which said support member is a thin sheetlike member substantially coextensive with said membrane within said chamber and secured to the walls of said chamber.

4. Container apparatus as defined in claim 1 in which said support member has lesser elasticity than said membrane and is subjected to tensile stress when said membrane receives a greater pressure in said second compartment than in said first compartment.

5. Container apparatus as defined in claim 1
   A. in which said membrane is secured to the walls of said chamber along a closed path, and
   B. in which said support member is a sheet having lesser elasticity than said membrane and is secured to the walls of said chamber along said closed path with a span therebetween adjacent said membrane and having no more slack than said membrane.

6. A container for the collection, storage and dialysis of a liquid, said container comprising
  A. a tubelike collection passage having first and second ends and a first storage volume therein between said ends,
  B. a first chamber compartment connected with said first end of said passage to receive liquid therefrom, said first compartment resiliently maintaining a normal uncollapsed shape and being resiliently collapsible to expel fluid therefrom by way of said passage and resiliently recovering said normal uncollapsed shape when said second end of said passage is open to aspirate fluid thereinto,
  C. a semipermeable dialysis membrane forming part of the wall of said first chamber compartment,
  D. a second chamber compartment contiguous with said first compartment and having said semipermeable dialysis membrane forming also a portion thereof for the passage of dialayzte between said first and second compartments through said membrane, and forming with said first compartment an enclosure normally fluidtight except for the entry of said passage into said first compartment, and
  E. liquid-pervious sheetlike means disposed in said first compartment and supportingly backing said membrane against a greater pressure in said second compartment than in said first compartment.

7. A container as defined in claim 6 in which said first chamber compartment is sufficiently large and sufficiently resiliently collapsible to diminish the storage volume thereof by at least twice said first storage volume.

8. A container for the collection, storage and dialysis of liquid, said container comprising
  A. a manually holdable body casing sufficiently rigid to be self-supporting,
  B. means forming a pouchlike chamber on said casing between opposed chamber walls secured together about the chamber periphery at said casing,
  C. a dialysis membrane secured within said chamber to the juncture of said chamber walls with said casing, and spanning the interior of said chamber to form therein first and second compartments on either side thereof and sealed from each other except through the porosity of said membrane,
  D. means forming a fluid passage having an inlet end and feeding at the other end thereof into only the first of said first and second compartments, and
  E. a liquid-pervious and essentially inelastic membrane-supporting sheet member having a peripheral portion secured to the walls of said chamber and having an internal portion disposed in said first compartment adjacent and coextensive with said span of said membrane.

* * * * *

UNITED STATES PATENT OFFICE
CERTIFICATE OF CORRECTION

Patent No. 3,640,393          Dated February 8, 1972

Inventor(s) Carl R. Hurtig

Figure 2:
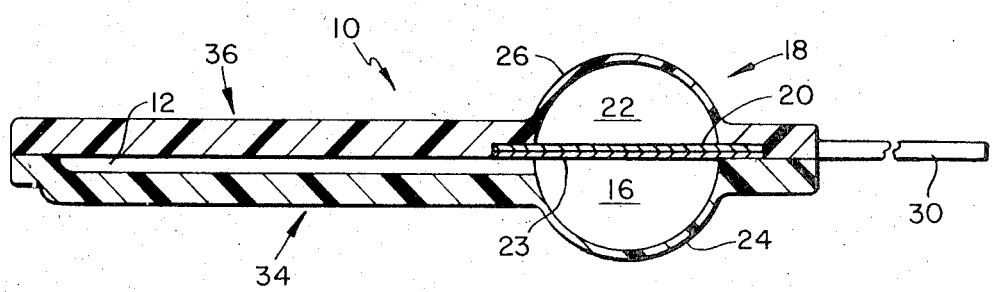
FIG. 2 is a cross-sectional view of the container of FIG. 1 taken along line 2—2 thereof.

It is certified that error appears in the above-identified patent and that said Letters Patent are hereby corrected as shown below:

Column 3, line 17, change "FIG. 1" to --FIG. 2--.

Column 3, line 18, delete "construction," and insert therefor --with--.

Column 3, line 64, change "walls portion" to --walls portions--.

Column 4, line 28, after "which, as" insert --a--.

Signed and sealed this 6th day of March 1973.

(SEAL)
Attest:

EDWARD M. FLETCHER, JR.
Attesting Officer

ROBERT GOTTSCHALK
Commissioner of Patents